United States Patent
Keite-Telgenbuscher et al.

(10) Patent No.: US 7,727,351 B2
(45) Date of Patent: Jun. 1, 2010

(54) PROCESS FOR PRODUCING ANISOTROPIC PSAS

(75) Inventors: Klaus Keite-Telgenbuscher, Hamburg (DE); Bernd Dietz, Ammersbek (DE); Lars Guldbrandsen, Hamburg (DE)

(73) Assignee: tesa SE, Hamburg (DE)

( * ) Notice: Subject to any disclaimer, the term of this patent is extended or adjusted under 35 U.S.C. 154(b) by 549 days.

(21) Appl. No.: 11/370,583

(22) Filed: Mar. 8, 2006

(65) Prior Publication Data
US 2007/0087192 A1    Apr. 19, 2007

(30) Foreign Application Priority Data
Oct. 18, 2005   (DE) .................. 10 2005 050 104

(51) Int. Cl.
 *B32B 37/26* (2006.01)
 *B32B 38/00* (2006.01)
 *B32B 38/04* (2006.01)
(52) U.S. Cl. .................. 156/247; 156/250; 156/289
(58) Field of Classification Search ............... 156/230, 156/231, 235, 238, 247, 289, 332, 250; 427/207.1, 427/208.4
See application file for complete search history.

(56) References Cited

U.S. PATENT DOCUMENTS

| | | | | |
|---|---|---|---|---|
| 4,056,661 A | * | 11/1977 | Sato et al. | 428/144 |
| 5,597,618 A | * | 1/1997 | Bayer et al. | 427/207.1 |
| 5,866,249 A | | 2/1999 | Yarusso et al. | |
| 6,472,025 B1 | | 10/2002 | Guldbrandsen et al. | |
| 6,652,908 B1 | | 11/2003 | Guldbrandsen et al. | |
| 6,991,828 B2 | | 1/2006 | Husemann et al. | |
| 2003/0143413 A1 | | 7/2003 | Storbeck et al. | |
| 2004/0010088 A1 | * | 1/2004 | Husemann et al. | 525/242 |
| 2004/0038061 A1 | | 2/2004 | Bargmann et al. | |
| 2004/0047985 A1 | | 3/2004 | Storbeck et al. | |
| 2004/0096585 A1 | | 5/2004 | Bonnebat et al. | |
| 2004/0265611 A1 | | 12/2004 | Husemann et al. | |
| 2005/0074606 A1 | * | 4/2005 | Nishiyama et al. | 428/354 |

FOREIGN PATENT DOCUMENTS

| | | |
|---|---|---|
| DE | 69406974 T | 7/1998 |
| DE | 199 059 34 | 8/2000 |
| DE | 19905935 | 8/2000 |
| DE | 100 34 069 | 2/2002 |
| DE | 100 52 955 | 6/2002 |

(Continued)

OTHER PUBLICATIONS

Donatas Satas, "Handbook of Pressure Sensitive Adhesive Technology" (van Nostrand, 1989).

(Continued)

*Primary Examiner*—Philip C Tucker
*Assistant Examiner*—Sing P Chan
(74) *Attorney, Agent, or Firm*—Norris McLaughlin & Marcus PA

(57) ABSTRACT

The invention relates to a process for producing anisotropic pressure-sensitive adhesives (PSAs) using conventional coating methods. It is envisaged that a PSA film be produced on a transport carrier and that it then be transferred to a further carrier material with simultaneous stretching, the elongation being as least 10%.

34 Claims, 3 Drawing Sheets

FOREIGN PATENT DOCUMENTS

| | | |
|---|---|---|
| DE | 101 57 154 | 5/2003 |
| DE | 10157153 | 9/2003 |
| DE | 60103298 T | 9/2004 |
| EP | 0 622 127 | 11/1994 |
| EP | 1361260 | 11/2003 |
| WO | WO 02/34854 | 5/2002 |
| WO | WO 03/044116 | 5/2003 |

OTHER PUBLICATIONS

Macromolecules, 1995, 28, 7886.

J.P. Fouassier, Photoinitiation, Photopolymerization and Photocuring, Fundamentals and Applications, Hanser Publishers, Munich, Vienna, New York 1995.

A. Carroy, et al., Chemistry & Technology of UV & EB formulation for Coatings, Inks & Paints, vol. 5, ed. By P.K.T. Oldring, publ. By SITA Technology, London, England 1994.

* cited by examiner

PROCESS FOR PRODUCING ANISOTROPIC PSAS

The invention relates to a process for producing anisotropic pressure-sensitive adhesives (PSAs) using conventional coating methods, where in a first step a PSA film is produced on a transport carrier and is subsequently transferred with simultaneous stretching to a further carrier material, and also to diecut products comprising said PSAs.

BACKGROUND OF THE INVENTION

All of today's known PSAs are distinguished by a more or less pronounced flow behaviour. When it is strongly pronounced, this flow behaviour is also known as cold flow or as the bleeding of a PSA. The inherent behaviour of a PSA leads to problems during processing and storage of roll product, and also for its use for diecut materials. For instance, the matrix stripping behaviour of self-adhesive diecut material can be critically disrupted by the flow behaviour of the PSA, leading to an increased reject rate. In order to counteract this it is often necessary to process the material under special temperature conditions; the maximum machine output may be limited, or else the error rate (proportion of remaining diecuts requiring matrix removal) goes up. Similarly, the storage times for the diecut materials are limited and/or special storage conditions are required, generally involving cost and/or inconvenience (for example, the air-conditioning of the storage spaces).

When materials are diecut, they can be kiss-cut or cut right through. Conventional PSAs have considerable disadvantages for use for diecut materials, especially when applied as a layer on a carrier material, in respect of both procedures:

The through-cut materials can be separated from one another only a short time after the diecutting operation. The PSAs coalesce again after the diecutting operation. The coalescence of the PSA occurs in diverse product forms: not only adhesive transfer tapes (PSA applied to a release material) and double-coated materials (PSA on both sides of a carrier, e.g. on foil, paper, web, lay or foam) but also single-coated materials (PSA on one side of a carrier, such as foil, paper, web, lay or foam) show the effect of PSA coalescence after the diecutting operation. The diecuts can no longer be separated from one another without disruption.

Particularly in the case of kiss-cutting, PSA coalescence is accompanied by the following problem: during the kiss-cutting of self-adhesive materials, the release material is cut as well, i.e. the diecutting blades penetrate down to a more or less defined depth into the substrate material (i.e. release material). This is inevitable from a technical standpoint, since in spite of tolerances in the face materials and also operational fluctuations the infeed motion of the die must still ensure reliable severing of the adhesive layer. Consequently the antiadhesively treated surface of the release material is always destroyed (in the majority of cases the release materials are siliconized, but this applies to all release systems described; see Satas, 3rd edition, chapters 26 and 27). The adhesive may flow into the substrate material of the release material (paper, PET, PP, PE) and adhere there. The diecut can no longer be removed unproblematically from the siliconized release material, since the edges of the diecut are stuck to the substrate. In a subsequent processing step the diecut, or the matrix around the diecuts, which is to be removed, may tear during removal. These tears lead to massive disruptions to production, since kiss-cutting operations are carried out primarily in a continuous rotary diecut process.

The effects described apply to all kinds of product constructions, such as adhesive transfer tapes and also to single-coated and double-coated substrates such as foils, webs, papers, lays or foams.

One approach towards improving the diecutting characteristics of PSA layers is the use of anisotropic, i.e. oriented, PSAs, as are described in DE 100 34 069 A1 or DE 100 52 955 A1.

The orientation of the macromolecules in the PSA plays an important part for other PSA properties as well. During the preparation, further processing or subsequent (mechanical) stressing of polymers or polymer compositions there may be high degrees of orientation of the macromolecules in preferential directions within the polymer assembly as a whole.

The orientation may lead to particular properties in the corresponding polymers. Some examples of properties which can be influenced by the degree of orientation include strength or stiffness of the polymers and/or of the films produced from them, thermal conductivity, thermal stability, and also anisotropy in respect of permeability to gases and liquids. In addition, however, oriented PSAs may exhibit anisotropic stress/strain characteristics and hence also anisotropic adhesive properties, such as under peeling or shearing stress. One important property dependant on the orientation of the units is the refraction of light (expressed by the corresponding refractive index, n) or the retardation, delta. This can therefore be used to determine the orientation. Another method of determining the orientation, particularly in PSAs, is the shrinkback of the free film.

Retention of orientation in partly crystalline rubber PSAs has already been described in U.S. Pat. No. 5,866,249 A. By virtue of the anisotropic adhesive properties it was possible to define innovative PSA applications. There, however, a description is given only of natural rubber PSAs, whose partial crystallization as a result of the orientation is, moreover, a prerequisite for the effects described, and which possess the known disadvantages as compared with acrylate PSAs for example, particularly in respect of ageing stability. The oriented PSA layers are produced in a solventless operation in the course of extrusion coating. This coating technology, however, requires a sharp reduction in the high molecular weight of natural rubber, with the consequence that, in particular, the cohesive properties of the resulting PSAs suffer and necessitate additional crosslinking operations.

DE 100 34 069 A1, DE 100 52 955 A1 and DE 101 57 154 A1 describe processes for preparing oriented acrylate PSAs and are based in each case on the introduction of orientations by means of the coating method—in particular by extrusion coating of the solvent-free PSA and subsequent fixing of the introduced orientations by means of electron-beam or UV irradiation. These methods cannot be applied to solvent-borne PSAs, since in the course of the coating operation any orientations introduced relax immediately because of the high molecular mobility.

Preference for a solventless coating method also poses disadvantages for technical implementation. For instance, owing to the low viscosities required for operation, it is impossible to process PSAs of very high molecular mass and hence great cohesion. In order to achieve high shear strengths it is necessary therefore to crosslink solventlessly coated PSAs after coating, preferably using radiation crosslinking.

Radiation crosslinking has further disadvantages. For instance, electron beams penetrate not only the PSA but also the carrier material, and hence lead to damage to the PSA tape. UV crosslinking is limited in its depth of penetration and restricted to substantially transparent PSAs. With radiation crosslinking, the quality of crosslinking is usually likewise only limited as compared with other crosslinking mechanisms. Furthermore, the cost and complexity of apparatus, particularly for electron-beam irradiation, is high.

EP 0 622 127 A1 describes a process for producing thin PSA films using melt mixing, the intention being to reduce the thickness of the film. The stretching of the film serves solely to reduce thickness.

It is an object of the invention to provide a process for producing highly anisotropic oriented pressure-sensitive adhesives which can be employed universally for all coating methods and which in particular allows the preparation of anisotropic PSAs from solution, dispersion or emulsion. The PSAs ought to possess a sufficient lifetime of the anisotropic state and by virtue of high anisotropy ought to possess favourable properties in respect of their use as PSAs, particularly in respect of their adhesive properties and in the production of diecut products, by avoiding or at least considerably reducing the outlined disadvantages of the prior art.

SUMMARY OF THE INVENTION

This object is achieved in accordance with the claims. The dependent claims relate to preferential versions of the process. The process of the invention comprises the following steps:
  producing a PSA film on a transport carrier and
  transferring the PSA film to a further, second carrier material with simultaneous stretching of the PSA film, the stretching (elongation) being at least 10%.

In one preferred embodiment the process of the invention allows coating to be uncoupled from the introduction of anisotropy (orientations). As a result it is possible with the inventive process to use all of the PSAs known to the skilled person and also all conventional coating methods.

DETAILED DESCRIPTION

The process of the invention has the great advantage of being able to provide, in particular, even PSAs that are coated from solution, dispersion or emulsion with anisotropic properties. It is preferred if the PSA film on the transport carrier is solvent-free prior to transfer. The term "solvent-free" or "solventless" is to be understood here to mean that any solvent or dispersing medium that may be present in the PSA is reduced at least down to a small residue of less than 10% by weight. The aforementioned advantage also holds for PSAs which during the coating operation are still in the form of a composition with monomers and/or oligomers and/or low-viscosity polymers having a molecular weight of less than 100 000 g/mol and which only after the coating operation undergo a chemical reaction, leading for example to polymerization, chain extension or chain branching, crosslinking or a combination of mechanisms of this type.

Not only during preparation but also during further processing or subsequent stressing of polymers or of polymer compositions it is possible for high degrees of orientation of the macromolecules in preferred directions to develop throughout the polymer assembly. In accordance with the invention, this orientation can be induced deliberately and allows the control and enhancement of the properties of the corresponding polymers in respect of specific desired utilities.

Anisotropically oriented pressure-sensitive adhesives possess the tendency, following stretching in a given direction, to move back into the initial state as a result of the 'entropy-elastic behaviour'. In order to give sufficient emphasis to the properties brought about by the orientation, the elongation during stretching, in one preferred embodiment of the process of the invention, is more than 10%, preferably more than 30%. This gives rise to products whose shrinkback as determined by test A (shrinkback measurement in the free film) is at least 3%. In another embodiment of the inventive process preference is given to generating elongations of more than 70%, leading to products with a shrinkback of at least 30%.

PSAs of this kind in layer form, with anisotropic orientation in accordance with the invention, following diecutting and/or slitting operations exhibit recovery of the PSA layer at the slit or diecut edge (preferably in the direction of stretching), and this recovery can be utilized for the cutting-out of diecut shapes which do not coalesce again. The greater the extent to which the diecut geometry has parting lines transverse to the direction of PSA stretching, the more effective this is. It also allows considerable improvement in, for example, the perforation of adhesive materials transverse to the web direction—for instance, in order to improve the separation or tearing behaviour.

Generally all pressure-sensitive adhesives are suitable in accordance with the invention, examples being those based on natural rubbers and synthetic rubbers such as isoprene, butyl rubber, neoprene, butadiene-acrylonitrile, styrene-butadiene-styrene and styrene-isoprene-styrene copolymers, and also those based on linear polyesters and copolyesters, polyurethanes, polysiloxane elastomers, and polyolefins, including in particular those based on acrylates. One advantageous development uses for the inventive purpose a pressure-sensitive adhesive based at least 50% by weight on at least one acrylic monomer from the group of the compounds of the following general formula:

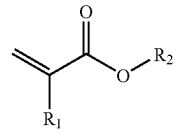

where $R_1$ is H or a $CH_3$ radical and $R_2$ is H or is selected from the group of saturated, unbranched or branched, substituted or unsubstituted $C_1$- to $C_{30}$ alkyl radicals.

Non-exclusive examples that may be mentioned of alkyl groups which may find application for the radical $R_2$ in a preferred way include the following: butyl-, pentyl-, hexyl-, heptyl-, octyl-, isooctyl-, 2-methylheptyl-, 2-ethylhexyl-, nonyl-, decyl-, dodecyl-, lauryl-, or stearyl (meth)acrylate or (meth)acrylic acid.

The process additionally proceeds excellently when inventive use is made of a pressure-sensitive adhesive based to up to 50% by weight on comonomers in the form of vinyl compounds, in particular on one or more vinyl compounds selected from the following group:
vinyl esters, vinyl halides, vinylidene halides, nitriles of ethylenically unsaturated hydrocarbons.

For the purposes of the invention, acrylic compounds with functional groups are also encompassed by the term "vinyl compound". Vinyl compounds of this kind containing functional groups are maleic anhydride, styrene, styrene compounds, vinyl acetate, (meth)acrylamides, N-substituted (meth)acrylamides, beta-acryloyloxypropionic acid, vinylacetic acid, fumaric acid, crotonic acid, aconitic acid, dimethylacrylic acid, trichloracrylic acid, itaconic acid, vinyl acetate, hydroxyalkyl (meth)acrylate, amino-containing (meth)acrylates, hydroxyl-containing (meth)acrylates, with particular preference 2-hydroxyethyl (meth)acrylate, 2-hydroxypropyl (meth)acrylate, and/or 4-hydroxybutyl (meth)acrylate, and photoinitiators with double bond functionalization; the above enumeration is only exemplary and not conclusive.

For the PSAs it is particularly advantageous if the composition of the corresponding monomers is selected such that the resultant adhesives possess pressure-sensitive adhesive properties in accordance with D. Satas [Handbook of Pressure Sensitive Adhesive Technology, 1989, VAN NOSTRAND REINHOLD, New York]. For this purpose the glass transition temperature of an acrylate PSA, for example, ought to be below 25° C.

Preference is given to PSAs in which the average molecular weight is at least 650 000 g/mol. This also applies to PSAs which during the coating operation are still in the form of a composition of monomers and/or oligomers and/or low-viscosity polymers having a molecular weight of less than 100 000 g/mol and which only after the coating operation undergo a chemical reaction leading, for example, to a polymerization, chain extension or chain branching, crosslinking or a combination of such mechanisms.

The provision of the PSAs employed for the inventive process, particularly the polyacrylate PSAs praised as being advantageous above, is known to the skilled worker. They are preferably prepared by means of a free-radically initiated addition polymerization.

The free-radical addition polymerization can be carried out in the presence of an organic solvent or in the presence of water or in mixtures of organic solvents and water or in bulk (without solvent). It is preferred to use as little solvent as possible. Depending on conversion and temperature the polymerization time is between 6 and 48 h.

In the case of solution polymerization the solvents used are preferably esters of saturated carboxylic acids (such as ethyl acetate), aliphatic hydrocarbons (such as n-hexane or n-heptane), ketones (such as acetone or methyl ethyl ketone), special-boiling-point spirit or mixtures of these solvents. For polymerization in aqueous media or in mixtures of organic and aqueous solvents it is preferred to add to the polymerization the stabilizers and emulsifiers that are known for this purpose to the skilled worker. Polymerization initiators employed are customary radical-forming compounds such as peroxides, azo compounds and peroxosulphates, for example. Initiator mixtures can be used as well. For the polymerization it is possible to use further regulators for lowering molecular weight and reducing polydispersity. As so-called polymerization regulators it is possible, for example, to use alcohols and ethers. The molecular weight of the acrylate PSAs is preferably between 650 000 and 2 000 000 g/mol, more preferably between 700 000 and 1 000 000 g/mol.

In one version of the process the polymerization is carried out in polymerization reactors which in general are provided with a stirrer, two or more feed vessels, reflux condenser, heating and cooling and are equipped for operation under $N_2$ atmosphere and superatmospheric pressure.

Another advantageous process version for polyacrylate PSAs is that of anionic polymerization. In this case the reaction medium used preferably comprises inert solvents, such as aliphatic and cycloaliphatic hydrocarbons, or else aromatic hydrocarbons.

The living polymer is represented in this case in general by the structure PL(A)-Me, where Me is a metal from group I, such as lithium, sodium or potassium, and PL(A) is a growing polymer block of the monomers A. The molar mass of the polymer under preparation is controlled by the ratio of initiator concentration to monomer concentration. Examples of suitable polymerization initiators include n-propyllithium, n-butyllithium, sec-butyllithium, 2-naphthyllithium, cyclohexyllithium or octyllithium, this enumeration making no claim to completeness. Initiators based on samarium complexes are also known for the polymerization of acrylates (Macromolecules, 1995, 28, 7886) and can be employed here.

A further possibility is to use difunctional initiators, such as 1,1,4,4-tetraphenyl-1,4-dilithiobutane or 1,1,4,4-tetraphenyl-1,4-dilithioisobutane, for example. Coinitiators can likewise be employed. Suitable coinitiators include lithium halides, alkali metal alkoxides or alkylaluminium compounds. In one very preferred version the ligands and coinitiators are selected such that acrylate monomers, such as n-butyl acrylate and 2-ethylhexyl acrylate, can be polymerized directly and do not have to be generated in the polymer by transesterification with the corresponding alcohol.

Also suitable for preparing polyacrylate PSAs with a narrow molecular weight distribution are controlled free-radical polymerization methods such as RAFT, NMRP or ATRP, for example. Corresponding details are set out in DE 101 57 154 A1 and are intended to be included by this reference.

The listings above serve only as examples of the respective groups of compound, and possess no claim to completeness.

Following polymerization in solvent, the polymerization medium can be removed under reduced pressure, an operation which is carried out at elevated temperatures, in the range from 80 to 150° C., for example. The polymers can then be employed in the solvent-free state, in particular as hot-melt PSAs, for example. In certain cases, it is also of advantage to prepare the polymers of the invention in bulk (without solvent).

To prepare the acrylate PSAs the polymers can be modified in a conventional manner. By way of example, tackifying resins, such as terpene, terpene-phenolic, C5, C9, C5/C9 hydrocarbon, pinene or indene resins or rosins can also be added in combination with one another. In addition it is also possible to use plasticizers, various fillers (e.g. fibers, carbon black, zinc oxide, titanium dioxide, solid microbeads, solid or hollow glass beads, silica, silicates, chalk, blocking-free isocyanates, etc.), ageing inhibitors, light stabilizers, ozone protectants, fatty acids, plasticizers, nucleators, expandants and/or accelerants as additions. Crosslinkers and crosslinking promoters can be mixed in as well. Examples of suitable crosslinkers for electron-beam crosslinking include difunctional or polyfunctional acrylates, difunctional or polyfunctional isocyanates or difunctional or polyfunctional epoxides.

Like all of the lists which follow, the lists above serve only as examples of the respective groups of compound, and possess no claim to completeness.

As coating methods it is possible, in accordance with the configuration of the PSA used, to use any of the coating methods that are familiar to the skilled worker. Corresponding methods are documented in "Handbook of Pressure Sensitive Adhesive Technology" by Donatas Satas (van Nostrand, 1989) and are included here by reference. In particular it is possible to use not only coating methods which presuppose the presence of a solvent or dispersant for adapting viscosity, but also solventless methods.

The process of the invention is characterized in particular in that the stretching takes place preferably by generation of a difference in speed as the PSA film is transferred from the transport material to the further (second) carrier material, the speed being increased. In one preferred embodiment, during the transfer, transport carrier and the second carrier material are guided by two opposing surfaces which move at different speeds, preferably of two rolls which rotate with a different peripheral speed, the speed of the second surface being increased by at least 10%.

The process is preferably carried out such that the distance between said surfaces is selected such that it corresponds at least to the sum of the thicknesses of transport carrier, PSA and second carrier material, but preferably is greater.

To improve the anisotropy the PSA may be crosslinked even prior to transfer; in another preferred embodiment of the process of the invention the PSA is crosslinked after transfer and stretching.

In accordance with the invention, PSAs are produced which have a shrinkback behaviour which by shrinkback measurement in the free film is at least 3%, preferably at least 30%.

As transport carrier it is preferred to use a release carrier or a machine element, with use of a film of liquid. The further, second carrier material is preferably from the group of metallic or polymeric carrier foils, papers, sheetlike textile structures or foams, or is likewise a release carrier.

Release carriers used are preferably antiadhesive or antiadhesively treated papers or foils. In this case, particularly for a continuous coating and transfer operation, stringent requirements are imposed on the thickness of material, the consistency of thickness (low tolerances) and flat lie (dimensional stability). Papers used with preference are highly compacted glassine papers, soft-calendered papers, machine-finished papers, clay-coated papers and polymer-coated (essentially polyolefin-coated) papers. As foil materials it is possible to use all known thermoplastics such as polyolefins, polyethers, polyesters, vinyl polymers and polyamides, preference being given to using PET, PI, PP and PE.

Release systems employed are silicones, paraffins, waxes, fluoropolymers (e.g. PTFE, PVDF), polyimide or polyolefins (PE, PP). Other release systems as well, however, such as those based on sol-gel materials, for example, can also be used.

In one advantageous embodiment the antiadhesive effect of the coating of the transport carrier (auxiliary carrier) is produced or assisted by a regular or irregular rough microstructure of the auxiliary carrier material.

In one preferred embodiment of the process a release carrier is used which can be used more than once. This may take place discontinuously, by winding of the release carrier onto the second carrier material following transfer of the PSA, or else, preferably, continuously, by configuring the release carrier as a circulating web or as the surface of a roll. This has the advantage that the cost of the process can be reduced considerably.

Preference, especially for circulating webs or roll surfaces, is given to covering the surface with a film of liquid which brings about or assists an antiadhesive effect.

During the stretching operation, the PSA is transferred from the transport carrier to the second carrier material, and this may take place on one side or else, preferably, on both sides.

Suitable second carrier material, depending on desired application, includes preferably metal foils or polymeric foils, such as BOPP or MOPP, PET, PVC, for example, or papers or sheetlike textile structures such as wovens, knits, lays or nonwovens. In addition, foams are also suitable (e.g. PU, PE, PE/EVA, EPDM, PP, PE, silicone) or, again, a release carrier, from the group for example of release papers (glassine papers, craft papers, polyolefinically coated papers) or release foils (metals, PET, PP or PE or combinations of these materials) are employed as coating substrates. When a further release carrier is used it should be borne in mind that it is advantageous if the release force of the PSA film from the second release carrier is greater than that from the first release carrier. Furthermore, it is possible to use all of the embodiments and materials already described for the first release carrier.

Stretching takes place in one preferred embodiment of the invention, by the setting of a difference in speed between the transport carrier which supplies the PSA to the transfer zone and the second carrier material which takes over the PSA film. In this case the speed of the second carrier material is preferably 10% or more, more preferably 30% or more, above that of the release carrier, which induces degrees of stretching of corresponding magnitude.

In one preferred embodiment of the process, transport carrier and second carrier material are guided during transfer by two opposing surfaces which move at different speeds, in particular by two rolls which rotate with a different peripheral speed. For easier obtainment of an inventive high anisotropy it is preferred to select the distance between said surfaces such that it is not smaller than the sum of the thicknesses of release carrier, PSA and second carrier material. With an increasing distance it is possible by this means to generate, for a short time, a free film of pressure-sensitive adhesive which can be easily stretched.

BRIEF DESCRIPTION OF THE DRAWINGS

The process of the invention is illustrated below with reference to FIGS. 1, 2, 3a, 3b, 3c and 3d.

Figure 1:
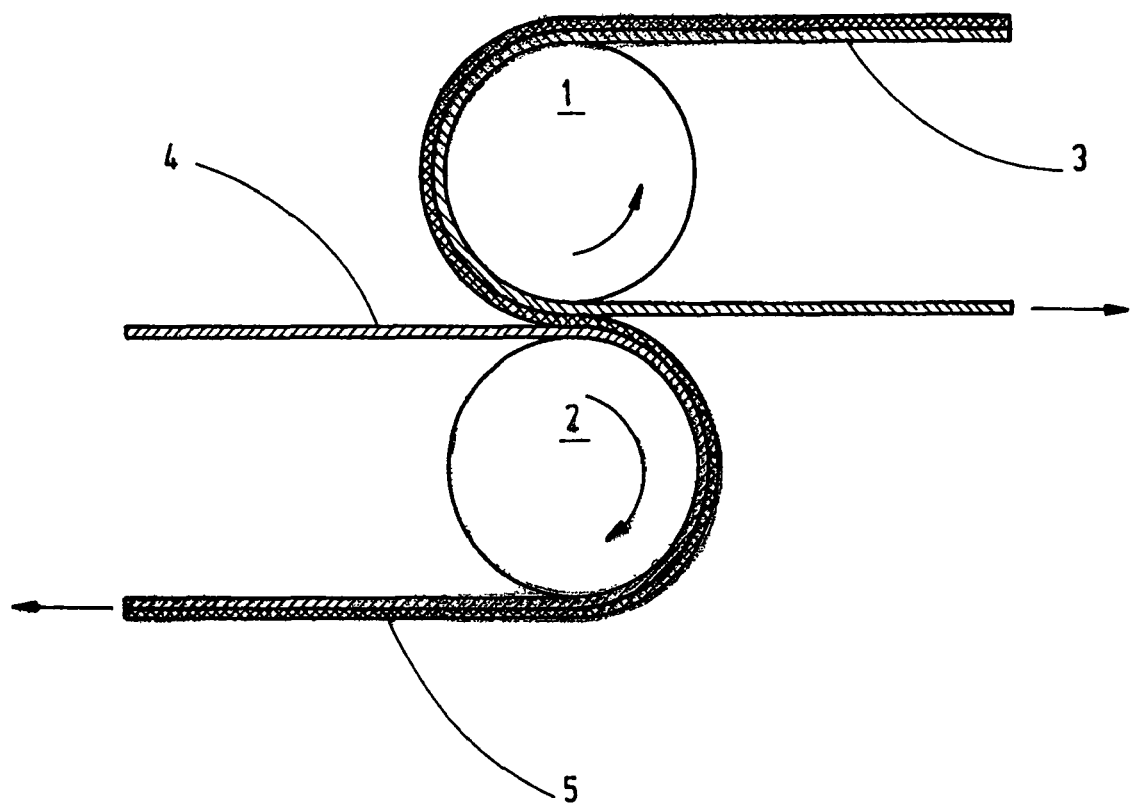
FIG. 1 shows one arrangement for process implementation.

One preferred arrangement is depicted by way of example in FIG. 1.

In this figure the reference numerals have the following meanings:
(1) first transfer roll
(2) second transfer roll
(3) transport carrier with PSA film
(4) second carrier material
(5) second carrier material with stretched PSA film In one advantageous version of the process the PSA is crosslinked after coating and prior to transfer. A higher degree of crosslinking produces a lower level of relaxation of the orientations introduced.

The PSA preferably has a degree of crosslinking corresponding to a gel value of at least 35%, in particular of at least 60%. In the present case the gel value is defined as the ratio of toluene-insoluble adhesive component to soluble adhesive component. In one preferred version of the process the PSAs are crosslinked with actinic radiation, such as UV rays or electron beams, for example.

In order to reduce the dose required it is possible to admix crosslinkers and/or crosslinking promoters to the PSA, especially promoters and/or crosslinkers which can be excited thermally or by means of electron beams. Suitable crosslinkers for electron-beam crosslinking are difunctional or polyfunctional acrylates or methacrylates.

For crosslinking with UV light it is possible to add UV-absorbing photoinitiators to the PSAs. Useful photoinitiators whose use is very effective are benzoin ethers, such as benzoin methyl ether and benzoin isopropyl ether, substituted acetophenones, such as 2,2-diethoxyacetophenone (available as Irgacure 651 ™ from Ciba Geigy), 2,2-dimethoxy-2-phenyl-1-phenylethanone, dimethoxyhydroxyacetophenone, substituted alpha ketols, such as 2-methoxy-2-hydroxypropiophenone, aromatic sulphonyl chlorides, such as 2-naphthylsulphonyl chloride, and photoactive oximes, such as 1-phenyl-1,2-propanedione-2-(O-ethoxycarbonyl)oxime.

The abovementioned and further useful photoinitiators, and others of the Norrish I or Norrish II type, may contain the following radicals: benzophenone-, acetophenone-, benzil-, benzoin-, hydroxyalkylphenone-, phenyl cyclohexyl ketone-, anthraquinone-, trimethylbenzoylphosphine oxide-, methylthiophenyl morpholine ketone-, amino ketone-, azobenzoin-, thioxanthone-, hexarylbisimidazole-, triazine-, or fluorenone, it being possible for each of these radicals to be additionally substituted by one or more halogen atoms and/or one or more alkyloxy groups and/or one or more amino groups or hydroxyl groups. A representative overview is given by Fouassier: "Photoinitiation, Photopolymerization and Photocuring: Fundamentals and Applications", Hanser, Munich 1995. For supplementary information it is possible to consult Carroy et al. in "Chemistry and Technology of UV and EB Formulation for Coatings, Inks and Paints", Oldring (ed.), 1994, SITA, London.

In a further preferred embodiment of the process the PSAs are crosslinked with thermally activable crosslinkers. Admixed for this purpose are, preferably, metal chelates, difunctional or polyfunctional epoxides, difunctional or polyfunctional hydroxides, and difunctional or polyfunctional isocyanates.

It is advantageous, furthermore, if before and/or during transfer and stretching, the PSA is subjected to specific thermal conditioning in order thus to be able to exert a specific influence over—for example—viscosity, stretchability and relaxation prior to transfer stretching. Hence the temperature of the PSA film ought to be below 100° C., preferably below 50° C. and more preferably below 25° C. in order to generate high anisotropy. Thermal conditioning may take place by thermal conduction, convection or radiation. Particularly when rolls are used to guide the release carrier, or as the release carrier itself, these rolls can be given a specific temperature.

In a further advantageous version of the process the PSA may be crosslinked (additionally where appropriate) after transfer and stretching, in order to freeze in the state of orientation that has been achieved. The time between stretching and crosslinking is preferably kept short and ought preferably to be not more than 10 s.

Figure 2:
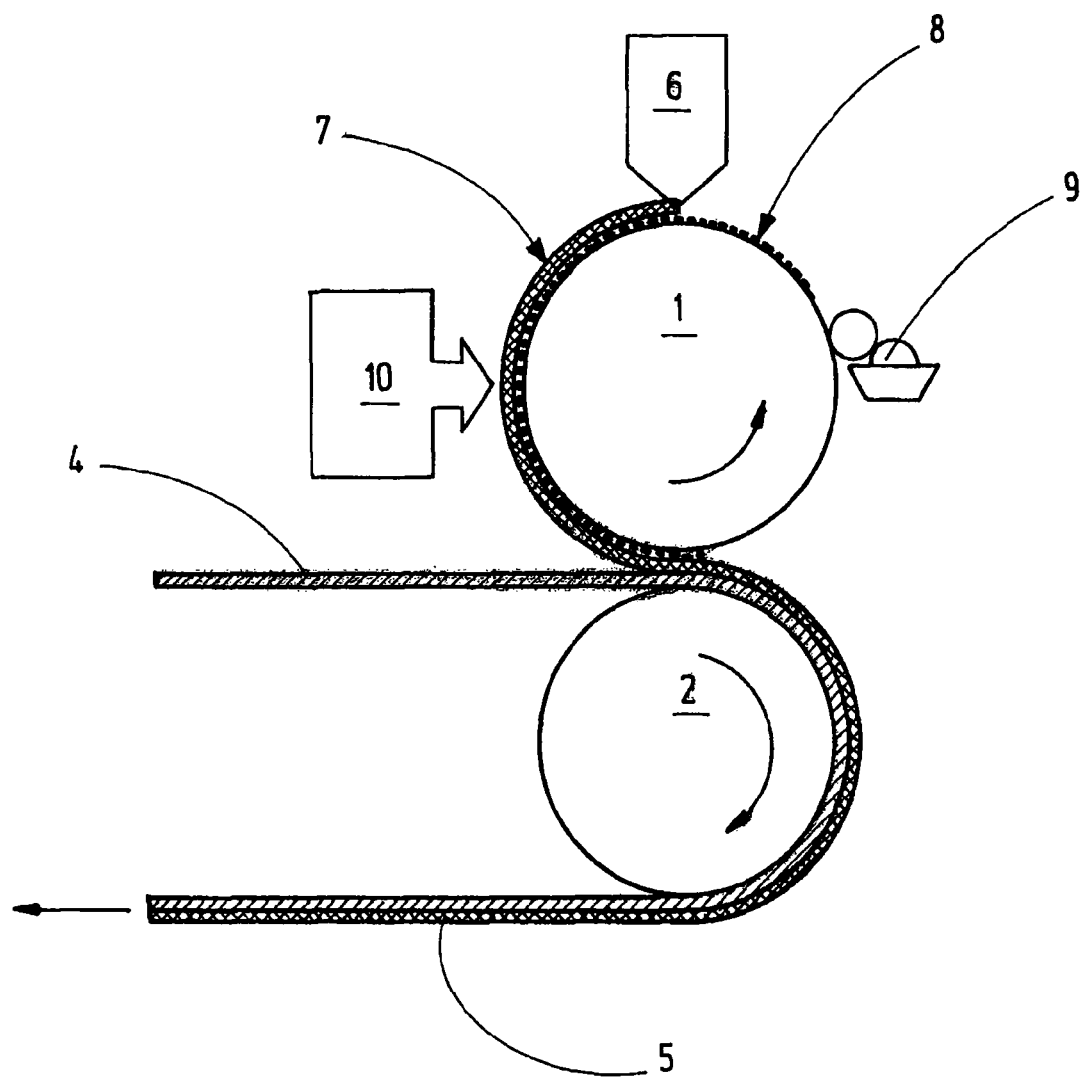
FIG. 2 shows a further arrangement for process implementation.

FIG. 2 shows as an example a further preferred embodiment of the process:

A die (6) coats a pressure-sensitive hotmelt adhesive (7) onto a roll (1), which may be configured as a smooth roll or textured roll. Besides the use of the single-manifold die (6) shown here it is also possible to use slot dies or multi-manifold dies having, for example, three or more individual layers. The roll (1) is configured advantageously as a chromium-plated steel roll with a high-gloss-polished surface, with a roughness Rz<+/−1 µm. A pre-metered film of fluid (8) is placed onto the roll (1) in a uniform way over the coating width, preferably via a roll applicator mechanism (9) with a prior-art configuration. The roll (1) charged with fluid (8) is coated preferably without contact with the film of adhesive (7) emerging from the die (6). In this case, therefore, a machine element (e.g. a roll) furnished with a film of fluid represents the transport carrier of the invention.

The film of adhesive (7) placed floatingly on the roll (1) is crosslinked directly on the roll (1) by means of a radiation device (10). The choice of crosslinking technology depends on the adhesive system to be crosslinked. Subsequently, the film of adhesive (7) is removed from the roll (1) by means of a contact roll (2). As the substrate (4) which removes the PSA film, a second carrier material is supplied to the contact roll and the film of adhesive (7) is therefore transferred to this carrier (the substrate) (4). As a result of the transport speed of the second carrier material (4), which exceeds the peripheral speed of the roll (1) and corresponds to the peripheral speed of the contact roll (2), the film of adhesive is stretched during the transfer.

In this version of an inventive embodiment the orientation already introduced by the melt coating process is first frozen in by crosslinking and then, in accordance with the invention, after crosslinking, the PSA film is stretched a further time, allowing the degree of anisotropy to be increased further.

In another variant embodiment of the process of the invention not merely a single PSA layer but rather a multi-ply construction including at least one PSA layer is applied to the transport carrier prior to the transfer and stretching operation. Such a structure also embraces a structure in which the PSA layer is embedded between further plies.

It is likewise an advantageous variant embodiment of the process of the invention to configure the second carrier material as a multi-ply construction which may already include one or more PSA layers. In this case these PSA layers may already be oriented or unoriented. In one particularly preferred embodiment the PSA is transferred first to one side and then to the other side of the second carrier material, and stretched in the process. This is accomplished preferably in a passage of the second carrier material through a unit which operates in accordance with the process of the invention.

In a further advantageous embodiment it is possible to provide the PSA layer which has been transferred to the second carrier material and stretched with a cover, which may be composed in turn, for example, of a release carrier or else of a further, third carrier material.

As a layer, following diecutting and/or slitting operations, the anisotropically oriented PSAs prepared in accordance with the invention exhibit recovery of the PSA layer at the slit or diecut edge, and this can be used to outstanding effect for the diecutting of diecut forms which do not coalesce again.

The invention accordingly provides pressure-sensitive adhesives thus prepared and provides their use for the production of diecut products, and also provides a diecut product comprising pressure-sensitive adhesives of high anisotropy and composed preferably of a carrier material coated on one or both sides with an anisotropic pressure-sensitive adhesive.

Diecuts of this kind can be used as single-sided or double-sided adhesive labels, for bonding in the household and in industry, particularly in automotive construction, for all assembly purposes, in the medical sector (patches, wound coverings) and the like, to name but a few examples of application. Generally speaking the diecuts can be employed wherever adhesive labels and adhesive sheets are used. The diecut products are particularly appropriate where value is placed on a clean, undamaged edge to the diecut.

EXAMPLES

The invention is described below by examples, without any intention that it should be restricted to these examples.

The following test methods were employed to evaluate the anisotropic properties of the PSAs prepared.

Test Methods

Measurement of Shrinkback (Test A)

Strips with a width of at least 20 mm and a length of 20 cm were cut parallel to the coating direction of the hotmelt. 3 strips at coat weights of 130 g/m$^2$, 4 strips at 100 g/m$^2$ and 8 strips at 50 g/m$^2$ were laminated to one another in order to give comparable layer thicknesses. The specimen obtained in this way was then cut to a width of exactly 20 mm and was overstuck at each end with paper strips, with a spacing of 15 cm. The test specimen thus prepared was then suspended vertically at RT and the change in length was monitored over time until no further contraction of the sample could be found. The initial length reduced by the final value was then reported, relative to the initial length, as the shrinkback, in percent.

To measure the orientation after a longer time, the coated and oriented PSAs were stored in the form of swatches for a prolonged period of time, and then analysed.

Determination of Gel Fraction (Test B)

After careful drying, solvent-free adhesive samples are welded into a pouch made of polyethylene nonwoven (Tyvek web). The difference in sample weights before and after extraction with toluene gives the gel index.

Production and Investigation of the Diecuts (Test C)

Diecuts were produced on commercial flat-bed or rotary cutters. For the rotary diecutting experiments, rotational diecutting cylinders from Rotometrics-Rotationsstanzwerkzeuge GmbH, Mainz-Kastel, were used.

For intermittent diecutting (flat-bed or reciprocating cutter), diecutting tools from Winck-Stanzwerkzeuge, Neuenhaus, were used.

The shrinkback of the PSA was assessed microscopically and measured quantitatively. The shrinkback distance L was defined as the distance from the diecut edge of the film and release material to the receded PSA layer.

Sample Preparation

Example 1

A reactor conventional for free-radical polymerizations was charged with 8 kg of acrylic acid, 48 kg of NTBAM, 8 kg of maleic anhydride, 368 kg of 2-ethylhexyl acrylate, 368 kg of n-butyl acrylate and 600 kg of acetone/isopropanol (97:3). After nitrogen gas had been passed through the reactor for 45 minutes with stirring, the reactor was heated to 58° C. and 400 g of Vazo 67™ (DuPont) were added. The external heating bath was then heated to 75° C. and the reaction was carried out constantly at this external temperature. After a reaction time of 1 h a further 400 g of Vazo 67™ (DuPont) were added. The reaction was terminated after a reaction time of 48 h and the system was cooled to room temperature. Then 200 kg of Norsolene M1080™ (Cray Valley), 100 kg of Foral 85 resin (Hercules), 11 kg/h of PETIA (UCB) and 1000 kg of special-boiling-point spirit were added to the solution of the mass and dissolved therein.

The solution of adhesive was coated on a conventional solvent coating system onto a low-release-force release paper (Lauffenberg) at a speed of 15 m/min in a width of 1100 mm, using a coating bar and with a coat weight of 130 g/m², and the coating of adhesive was dried in a drying tunnel with a temperature profile rising from 60° C. to 100° C. Thereafter the PSA film was crosslinked in-line by means of electron beams, with an acceleration voltage of 180 kV and a pre-set dose of 60 kGy. A laminating station following the crosslinking station in-line was supplied as in FIG. 1 with a 12 μm PET sheet, at a speed of 20 m/min, and the PSA film was transferred to this sheet and at the same time stretched. The resulting PSA film had a thickness of approximately 100 μm. The adhesive was lined with a double-sidedly siliconized release paper before being wound up.

In a second operation the free side of the PET sheet was likewise coated with a layer of adhesive stretched in accordance with the invention.

Example 2

Example 2 is the same as Example 1 except that the PET sheet was replaced by a double-sidedly siliconized release paper having a high release force on the transfer side (Lauffenberg). In this case the second operation was not performed.

Example 3

Example 3 is the same as Example 2 except that the PSA film was applied with a coat weight of 100 g/m² and the release paper was supplied with a speed of 15 m/min, so that there was no stretching during transfer.

Example 4

A reactor conventional for free-radical polymerizations was charged with 8 kg of acrylic acid, 48 kg of NTBAM, 8 kg of maleic anhydride, 368 kg of 2-ethylhexyl acrylate, 368 kg of n-butyl acrylate and 600 kg of acetone/isopropanol (97:3). After nitrogen gas had been passed through the reactor for 45 minutes with stirring, the reactor was heated to 58° C. and 400 g of Vazo 67™ (DuPont) were added. The external heating bath was then heated to 75° C. and the reaction was carried out constantly at this external temperature.

After a reaction time of 1 h a further 400 g of Vazo 67™ (DuPont) were added. The reaction was terminated after a time of 48 h and the system was cooled to room temperature. The adhesive was then freed from the solvent in a concentrating extruder (W&P ZSK 58, L=40 D). The backwards degassing vacuum was 250 mbar; the 3 vacuum stages were operated at 300; 250 and 6 mbar. The entry temperature of the polymer solution was 110° C. The rotary speed was set at 185 revolutions per minute, so that the extruder was operated with a specific drive energy of 0.12 kWh/kg. The throughput was 110 kg/h of feed solution, corresponding to 51 kg/h of concentrate. The exit temperature measured was 117° C. The acrylate hotmelt was passed on to a second twin-screw extruder from Krupp Werner and Pfleiderer (KWP ZSK 40, L=36 D). The entry temperature of the acrylate hotmelt was 117° C. In the second extruder the concentrate was compounded with 12.6. kg/h of Norsolene M1080™ resin (Cray Valley), 6.3 kg/h of Foral 85 resin (Hercules) and 0.7 kg/h of PETIA (UCB). The extruder was operated with a rotary speed of 210 revolutions per minute and a specific drive energy of 0.009 kWh/kg. The total throughput was 70 kg/h. The exit temperature was 114° C.

Further processing of the adhesive took place as described by FIG. 2 (see also DE 199 059 34). By means of a single-screw extruder (L/D:27) the acrylate hotmelt PSA was coated without contact onto a smooth roll at a temperature of 140° C. by means of a single-manifold extrusion die (Fabrikat Breyer) with a working width of 350 mm. The fluid wetting the smooth roll was water. The temperature of the smooth roll was 35° C. The distance between die and roll was 4 mm.

A film of adhesive was placed onto the smooth roll at a speed of 15 m/min, giving a thickness of 130 μm, and this film was crosslinked directly on the smooth roll by means of electron beams, with an acceleration voltage of 180 kV and a set dose of 80 kGy. Subsequently the film was transferred via the web-guiding contact roll to a double-sidedly silicone-coated release paper. This release paper ran with a web speed of 20 m/min. The resulting film of PSA had a thickness of approximately 100 µm.

Example 5

Example 5 is the same as Example 4 except that the film of hotmelt PSA was coated at a coat weight of 100 g/m² and the release paper was supplied with a speed of 15 m/min, so that there was no stretching during transfer.

Example 6

Example 6 is the same as Example 4 except that the release paper was replaced by a PET sheet 12 µm thick. Before being wound up, the adhesive was lined with a double-sidedly siliconized release paper.

In a second operation the free side of the PET sheet was likewise coated with a layer of adhesive stretched in accordance with the invention.

Example 7

Example 7 is the same as Example 5 except that the release paper was replaced by a PET sheet 12 µm thick. Before being wound up, the adhesive was lined with a double-sidedly siliconized release paper.

In a second operation the free side of the PET sheet was likewise coated with a layer of adhesive stretched in accordance with the invention.

Results

Gel Indices

To assess the efficiency of crosslinking, the gel index of the adhesives is measured in accordance with test B. The gel index shows the toluene-insoluble fraction of the PSA. The results of the analysis are set out in Table 1:

TABLE 1

| Gel indices | | | | | | | |
|---|---|---|---|---|---|---|---|
| | Example | | | | | | |
| | 1 | 2 | 3 | 4 | 5 | 6 | 7 |
| Gel index [%] | 42 | 41 | 44 | 50 | 49 | 52 | 49 |

Within the groups of examples the gel indices are comparable, and so equivalent crosslinking states and equivalent relaxation properties on the part of the PSAs can be assumed.

Shrinkback:

For the advantageous application of the oriented PSAs in the diecutting sector the shrinkback is a critical factor. Oriented adhesives possess the tendency, after stretching in a given direction, to move back to the original state as a result of the entropy-elastic behaviour. To capture this problem area analytically, the shrinkback of the oriented specimens in the free film was determined in accordance with test A.

The values determined at room temperature are listed in Table 2:

TABLE 2

| Shrinkback of the free film | | | | |
|---|---|---|---|---|
| | Example | | | |
| | 2 | 3 | 4 | 5 |
| Shrinkback [%] | 12 | extension as a result of inherent weight | 71 | 60 |

The values were determined in each case after storage for one week.

Diecut Shrinkback

Figure 3A:
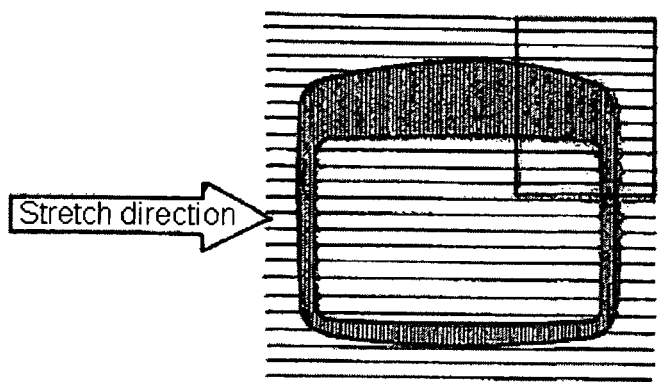
FIGS. 3a, 3b, 3c, 3d show a diecut with adhesive recovery behaviour.
Figure 3B:
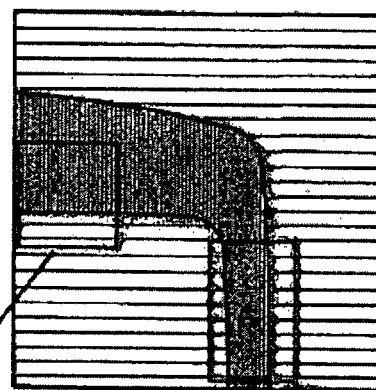
Figure 3C:
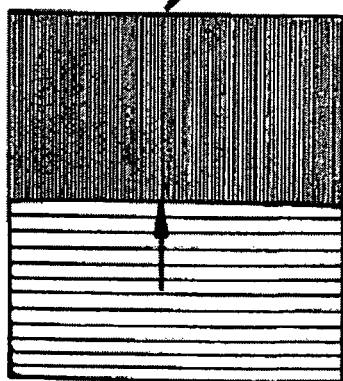
Figure 3D:
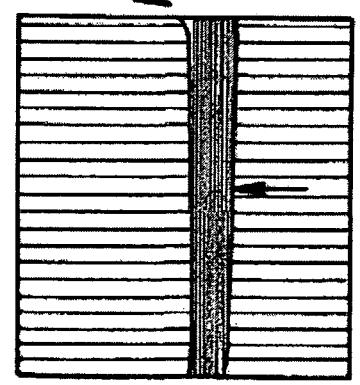

To assess the recovery behaviour of the PSA in diecut form, diecuts were produced from Examples 1, 6 and 7 by rotary diecutting. FIG. 3a shows the form of the diecut, with the arrow indicating the direction of stretch. The recovery behaviour was investigated microscopically on the connecting arms (diecut edge extends transverse to the direction of stretching). In FIG. 3b this shrinkback measurement site is shown on the right, while FIGS. 3c and 3d show the micrograph taken for assessing the connecting arm (longitudinally to the direction of stretch), in an enlarged view.

Table 3 records the observed shrinkback of the PSA as a function of time and storage temperature after diecutting.

TABLE 3

| Diecut shrinkback | | | |
|---|---|---|---|
| | Example | | |
| | 1 | 6 | 7 |
| Shrinkback after 1 day 23° C. [µm] | 10 | 22 | 16 |
| Shrinkback after 7 days 23° C. [µm] | 12 | 48 | 26 |
| Shrinkback after 1 day 60° C. [µm] | 17 | 63 | 29 |
| Shrinkback after 7 days 60° C. [µm] | 18 | 65 | — |

For the inventive use the PSAs preferably possess a recovery behaviour of 10 to 800 µm, in particular from 30 to 100 µm, as measured in the direction of stretch. Recovery can be accelerated by raising the temperature. At the higher temperature a virtually constant ultimate value is achieved after just a few days.

The recovery behaviour of the PSA layer was observed both in resin-free acrylate hotmelts and in resin-blended acrylate hotmelts. The invention is significant particularly for resin-blended acrylate hotmelts, since these systems, owing to their inherently lower viscosity, as compared with straight acrylates, have a significantly more pronounced flow behaviour.

In this way it is possible to utilize the positive properties of hotmelt PSAs for using diecut products without the more substantial flow behaviour adversely affecting the diecutting operation or the diecut products produced.

LIST OF REFERENCE NUMERALS

1 first transfer roll (coating roll)
2 second transfer roll (contact roll)
3 transport carrier with PSA film
4 second carrier material
5 second carrier material with stretched PSA film
6 PSA feed 7 PSA film
8 fluid film
9 fluid applicator mechanism
10 radiation source for crosslinking

The invention claimed is:

1. Process for producing anisotropic pressure-sensitive adhesives which comprises applying a solution, dispersion or emulsion of a pressure-sensitive adhesive to a transport carrier and drying to produce a pressure-sensitive adhesive film on said transport carrier, and subsequently transferring said pressure-sensitive adhesive film to a second carrier material with simultaneous stretching, the elongation of said film during said stretching being at least 10%.

2. Process according to claim 1, wherein said elongation is more than 10%.

3. Process of claim 2, wherein said elongation is more than 30%.

4. Process according to claim 1, wherein the stretching is accomplished by generating a difference in speed during PSA film transfer from the transport material to the second carrier material, the speed of the transport material being increased relative to the other.

5. Process according to claim 1, wherein during the transfer of the pressure-sensitive film the transport carrier and the second carrier material are guided by opposing first and second surfaces which move at different speeds, the speed of the second surface being at least 10% higher than that of the first surface.

6. Process according to claim 5, wherein the distance between said surfaces corresponds to at least the sum of the thicknesses of the transport carrier, pressure-sensitive adhesive and second carrier material.

7. Process according to claim 1, wherein the pressure-sensitive adhesive is crosslinked prior to transfer.

8. Process according to claim 1, wherein the pressure-sensitive adhesive is crosslinked after transfer and stretching.

9. Process according to claim 1, wherein the pressure-sensitive adhesive exhibits shrinkback behavior which by shrinkback measurement in the free film is at least 3%.

10. Process of claim 9, wherein said shrinkback is at least 30%.

11. Process according to claim 1, wherein said transport carrier is a release carrier or a machine element.

12. Process according to claim 11, wherein the release carrier is an antiadhesive or antiadhesively treated paper, sheetlike textile structure or polymer or metal foil or a composite of such antiadhesive or antiadhesively treated materials.

13. Process according to claim 12, wherein the antiadhesive effect of the release carrier is produced or supported by a regular or irregular rough surface microstructure.

14. Process according to claim 11, wherein the antiadhesive effect of the release carrier is produced or supported by a regular or irregular rough surface microstructure.

15. Process according to claim 11, wherein the antiadhesive effect is produced or assisted by a film of liquid.

16. Process according to claim 11, wherein the release carrier is reusable and is configured as a continuous belt or roll.

17. Process according to claim 1, wherein the second carrier material is formed of a material selected from the group consisting of metallic or polymeric carrier foils, papers, sheetlike textiles and foams, or is a release carrier.

18. Process of claim 17, wherein the release carrier is an antiadhesive or antiadhesively treated paper, sheetlike textile structure or polymer or metal foil or a composite of such antiadhesive or antiadhesively treated materials.

19. Process according to claim 17, wherein the antiadhesive effect of the release carrier is produced or supported by a regular or irregular rough surface microstructure.

20. Process according to claim 1, wherein atop the transport carrier a multilayer ply construction is applied which comprises at least one PSA.

21. Process according to claim 1, wherein the second carrier material has a multilayer ply construction which optionally comprises at least one further pressure-sensitive adhesive.

22. Process according to claim 1, wherein the pressure-sensitive adhesive film is applied to both sides of the second carrier material.

23. Process according to claim 1, wherein the pressure-sensitive adhesive is provided with a cover after transfer with simultaneous stretching.

24. Process according to claim 1, wherein the pressure-sensitive adhesive comprises at least one base polymer selected from the group consisting of natural or synthetic rubbers, polyesters, polyurethanes, acrylates, olefinic polymers or copolymers and silicones.

25. Process according to claim 24, wherein the at least one base polymer is at least in part of at least one acrylic monomer of the formula

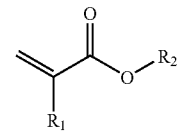

where $R_1$ is H or a $CH_3$ radical and $R_2$ is H or is selected from the group consisting of saturated, unbranched or branched, substituted or unsubstituted $C_1$- to $C_{30}$ alkyl radicals and the at least one acrylic monomer has a mass fraction of at least 50% in the pressure-sensitive adhesive.

26. Process according to claim 1, wherein up to 50% by weight of the pressure-sensitive adhesive is formed of comonomers in the form of vinyl compounds.

27. Process according to claim 26, wherein said vinyl compounds selected from the group consisting of vinyl esters, vinyl halides, vinylidene halides, and nitriles of ethylenically unsaturated hydrocarbons.

28. Process according to claim 1, wherein the average molecular weight of the pressure-sensitive adhesive is greater than 650 000 g/mol.

29. Process according to claim 1, wherein the pressure-sensitive adhesive composition at the time of coating is present in the form of at least one kind of monomer and/or at least one kind of oligomer and/or at least one kind of polymer having a molecular weight below 100 000 g/mol and after the coating operation a chemical reaction takes place.

30. Process according to claim 1, wherein the pressure-sensitive adhesive is purposively temperature-controlled before and/or during transfer and stretching.

31. Process according to claim 30, wherein said temperature control controls the temperature of said pressure-sensitive adhesive to below 100° C.

32. Process according to claim 31, wherein said temperature is below 50° C.

33. Process according to claim 32, wherein said temperature is below 25° C.

34. A method for producing diecut products which comprises producing said diecut products with the pressure sensitive adhesive of claim 1.

* * * * *